Figure 1:
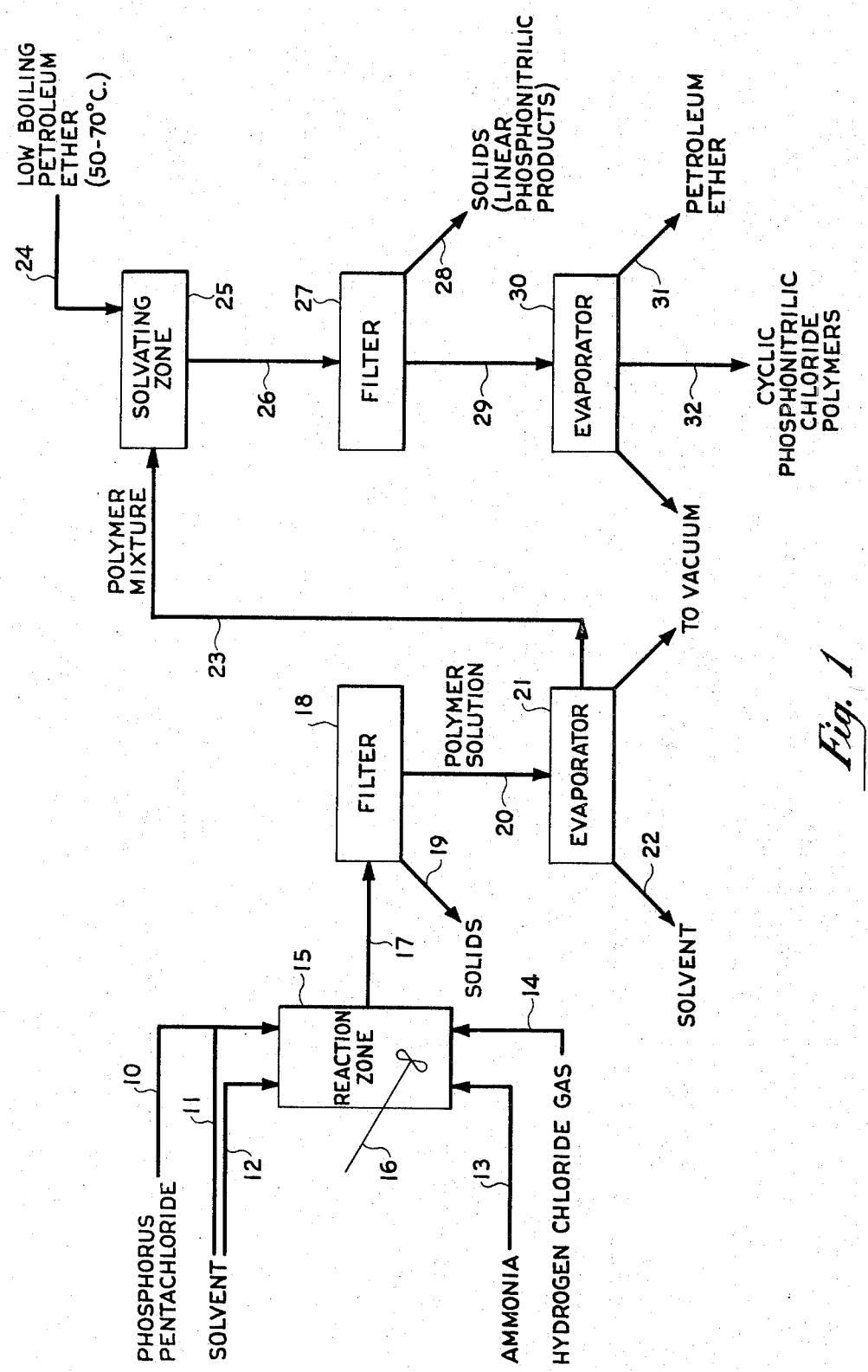

3,367,750
PHOSPHONITRILIC CHLORIDE PROCESS
Daniel J. Jaszka, Tonawanda, and Theodore H. Dexter, Lewiston, N.Y., assignors to Hooker Chemical Corporation, Niagara Falls, N.Y., a corporation of New York
Filed Aug. 14, 1962, Ser. No. 216,788
11 Claims. (Cl. 23—357)

This invention relates to improvements in a method of manufacture of phosphonitrilic chloride polymers whereby a high proportion of cyclic phosphonitrilic chloride polymers is produced by comparatively simple and inexpensive operation.

The formation of polymeric phosphonitrilic chlorides has been described in "Chemical Reviews," vol. 32, pp. 111 through 127 (1943), by Audreith, et al. A method described is the refluxing of phosphorus pentachloride and ammonium chloride in an inert solvent. It is most desirable that the ammonium chloride be of high purity to avoid side reactions. When the reaction has proceeded substantially to completion, a mixture of polymers is obtained. This mixture consists of (a) cyclic phosphonitrilic chloride polymers $(PNCl_2)_n$ where $n$ is an integer of three or more, which are soluble in low boiling petroleum ether and (b) linear $PNCl_2$ chains end blocked with the elements of phosphorus pentachloride and having the probable formula $(PNCl_2)_nPCl_5$, which are insoluble in said ether.

Typical proportions, expressed as percentages by weight, of the two types of polymers obtained by this method are 75 to 85 percent of cyclic polymer and 15 to 25 percent of linear polymer. Furthermore, the proportions of the individual cyclic polymers found in the crude mixture of cyclic and linear polymers are approximately 30 to 35 percent of the trimer $(PNCl_2)_3$, 10 to 20 percent of the tetramer $(PNCl_2)_4$ and 30 to 40 percent of the higher cyclic polymers, the percentages of various polymers being expressed as percentages by weight. The proportions of the two types of polymers may be varied to some extent by varying the amounts of phosphorus pentachloride and ammonium chloride used.

The trimer and tetramer phosphonitrilic chloride polymers are in demand because of their elastic, heat and fire-resistant qualities, for such applications as coatings for ceramics and metals, fireproofing of textiles, additives for increasing heat resistance and as a reactant, in preparing thermally stable resins. Accordingly, it is necessary to provide suitable means of increased yields to obtain lower cyclic polymers if their commercial manufacture is to be economically feasible.

The common method of producing ammonium chloride on a commercial scale is by the mixing of crude or commercial grade hydrochloric acid and a crude solution of ammonia, then recovering the ammonium chloride so formed from the reaction mixture by concentration and crystallization. This process, due to the presence of impurities in the hydrochloric acid solution and gas liquor, ordinarily gives a product of gray color and due to the water content of both raw materials involves a considerable cost for heat for concentration. Another means is the reaction of a crude solution of ammonia in gaseous hydrochloric acid to produce ammonium chloride. This process required the evaporation of less water from the crystals formed and produced a pure product. Still another process is the use of gaseous ammonia and gaseous hydrochloric acid with the employment of temperatures between 230 and 310° C. The resulting ammonium chloride crystals produced by this method are extremely pure, tough fibrous crystals.

Generally, the ammonium chloride used in the production of phosphonitrilic chloride polymers is used as received, or is ground to fine particle size by slow, tedious, ball-mill procedures. Mechanical means such as ball-milling, colloid mills, vibro energy mills, fluid energy mills etc., for particle size reduction are inexpedient because of low capacity, high cost and excessive mechanical handling, in addition to which the ammonium chloride tends to fuse into larger crystals upon prolonged standing so that the ammonium chloride must be rapidly used after mechanical reduction if any advantage is to be secured.

We have found that ultrafineness of particle size of ammonium chloride is particularly desirable in the production of phosphonitrilic chloride. This extra fineness unexpectedly increases the efficiency of the reaction and is responsible for the production of a higher percentage of cyclic polymers in the reaction products.

It is the object of this invention to provide a method for the production of phosphonitrilic chloride polymers utilizing an extremely fine particle size ammonium chloride crystal to achieve a greater efficiency of the reaction and a higher percentage of cyclic polymers in the reaction products. Other objects will become apparent to those skilled in the art upon reference to the following detailed description and examples, reference being had to the accompanying drawing which is a flow sheet of our process for manufacturing phosphonitrilic chlorides.

This invention provides a novel method for producing phosphonitrilic chloride polymers which comprises reacting ammonia and hydrogen chloride in the presence of an inert solvent to form a dispersion of ammonium chloride in said solvent, introducing phosphorus pentachloride to the said dispersion whereupon phosphonitrilic chloride polymer is formed and recovering the polymer from the reaction product. Thereafter the said polymers can be slurried with petroleum ether, in which the cyclic polymers are soluble, whereas the linear polymers are not, and thereafter the insoluble polymers are separated, after which the polymer solution is separated into a vapor phase of petroleum ether in which the cyclic polymers are soluble whereas the linear polymers are not and thereafter the insoluble polymers are separated, after which the polymer solution is separated into a vapor phase of petroleum ether and a solid phase of cyclic polymers of phosphonitrilic chloride.

Our invention is shown schematically in FIGURE 1, reacting ammonia via conduit 13 and hydrogen chloride via conduit 14 in presence of solvent via conduit 12 in reaction zone 15 with agitation 16 to form a slurry of ammonium chloride in said solvent, introducing phosphorus pentachloride via conduit 10 and solvent via conduit 11 to said dispersion, reacting to form phosphonitrilic chloride polymer, discharging the resulting product liquor via conduit 17 to separator 18 where the separated out solids are discharged via conduit 19 and polymer solution in conduit 20 transfers to evaporator 21. Solvents are removed via conduit 22 and the polymer mixture conveyed by conduit 23 to solvating zone 25, low boiling petroleum ether added via conduit 24 to said zone and resulting polymer slurry moved via conduit 26 to separator 27, the solid linear phosphonitrilic chloride polymers discharged via conduit 28, polymer solution transferred via conduit 29 to evaporator 30 where said ether removed via conduit 31 and cyclic phosphonitrilic chloride polymers are discharged from evaporator via conduit 32.

Ammonium chloride produced in the above manner possesses a particle size in the range of from one to two microns. Based on microscopic measurements the material possesses a specific surface of about $2.6 \times 10^4$ square centimeters per gram which is approximately 7 times more available surface than that of ammonium chloride produced by wet ball-milling. The more typical ammonium chloride of commerce possesses a specific surface of about 800 square centimeters per gram.

The reaction of ammonia and hydrochloric acid gas is exothermic, therefore, it is necessary to maintain the reaction medium at room temperature. Employment of higher temperatures will cause the crystals to fuse together and therefore defeat the purpose of this invention.

In carrying out the object of this invention, it has been found useful to agitate the reaction media in order to eliminate localized hotspots in the reaction media.

The solvent has a boiling point which will allow the reaction of phosphorus pentachloride and ammonium chloride to proceed preferably under reflux conditions, is inert to the raw materials and reaction products and also is an efficient solvent for phosphorus pentachloride. Lastly the solvent boiling point should be sufficiently low that the solvent may be removed afterwards from the crude phosphonitrilic polymer without further polymerization. We prefer to use monochlorobenzene as the solvent in our invention although other chlorinated hydrocarbon solvents or phosphorus oxychloride may be used. Among the other satisfactory solvents are trichlorobenzenes, orthodichlorobenzene, sym-tetrachloroethane and tetrachloroethylene. Still other useful solvents are benzyl chloride, chloroform and carbon tetrachloride. Monochlorobenzene is a suitable solvent since it offers a comparatively low boiling point, is economical, less toxic than tetrachloroethane and readily available. An important factor affecting the rate of reaction to form phosphonitrilic chloride is the reaction temperature. Therefore, the chlorinated hydrocarbon solvent used should, at atmospheric pressure, boil at 100° C. or higher.

There is a general relationship of temperature to composition of crude phosphonitrilic polymers formed. As the temperature is increased up to about 300° C. progressively higher amounts of the higher cyclic phosphonitrilic chloride polymers are formed. We have found it necessary to control the temperature through all steps of our invention and not just in the first step of forming the crude phosphonitrilic chloride polymers if the objects of this invention are to be achieved. From the table of solvent boiling points below, it will be seen that various reflux temperatures may be obtained by appropriate choice of solvent while reacting the ammonium chloride and phosphorus pentachloride.

| Reaction media: | Boiling point, ° C. |
|---|---|
| Chloroform | 61 |
| Carbon tetrachloride | 77 |
| Phosphorus oxychloride | 107 |
| Tetra-chloroethylene | 121 |
| Mono-chlorobenzene | 132 |
| Sym-tetra-chloroethane | 146 |
| Benzyl chloride | 179 |
| O-dichlorobenzene | 180 |
| Trichlorobenzenes | 208–218 |

Preferably the temperature employed during said reaction should be between 100° and 150° centigrade so that the greatest possible amount of trimeric phosphonitrilic chloride may be formed in an economically reasonable period of time.

The product liquor may be separated from the solids contained therein by passing the hot liquor through a filter. Of the classes of filters, i.e., vacuum, gravity and pressure, vacuum is preferred, although gravity may be used without difficulty. In keeping with good engineering practice, filter aids, such as diatomaceous earth, may be used to increase filtration rate. Conventional filter media are suitable for this process.

Recently, Paddock and Searle, in Canadian Patent 614,267 (1961), have disclosed the use of certain anhydrous metallic salts which are capable of forming a co-ordination complex with ammonia and amines, the object of which is to promote and cause the completion of the reaction between phophorus pentachloride and ammonium chloride in a materially shorter period of time. Anhydrous metallic salts found suitable for this purpose include cobaltous chloride, aluminum chloride, manganous chloride, cupric chloride, stannic chloride, magnesium chloride, zinc chloride and titanium chloride. It is to these metallic salts the term catalyst, hereinafter employed, refers.

According to a preferred embodiment of the present invention we effect the interaction of gaseous ammonia and gaseous hydrogen chloride by bubbling these gases in nearly stoichiometric quantities into an inert hydrocarbon solvent which is maintained at room temperature, the ammonia being introduced into the reaction vessel on the side of the vessel opposite the point where the hydrogen chloride is introduced thereby securing a gradual intimate intermixing of the gases. Ample liquor depth is provided to produce a product in the liquid medium. Loss of ammonia and hydrochloric acid and the reaction product from the reaction vessel is negligible. Having formed the ammonium chloride in situ, the phosphonitrilic chloride is now prepared by adding a solution of phosphorus pentachloride to the reaction vessel which is now maintained at approximate reflux temperature. The refluxing continues until the reaction slowly subsides and the evolution of hydrogen chloride is barely detectable. The excess of ammonium chloride is filtered off and the solution concentrated under reduced pressure at as low a temperature as possible.

The invention is illustrated by but not limited by the following examples:

*Example 1*

Into a four liter resin flask equipped with a stirrer, thermometer and two gas inlet tubes, spaced as far apart and immersed as deeply as possible, were placed two liters of monochlorobenzene. Since the reaction is exothermic, a water bath was employed to maintain the reaction mixture at approximately 30° C. Hydrogen chloride and ammonia were added from opposite sides at 20 millimoles per minute with continuous slow stirring for two hours. At the end of this addition, the flow of ammonia was halted and the flow of hydrogen chloride continued until the mixture was definitely acid. 2.6 moles of ammonium chloride were formed and all particles were less than 5 microns in size. Thereafter, the temperature was increased to the boiling point of the solvent under reflux conditions. Phosphorus pentachloride (2.0 moles) dissolved in one liter of hot monochlorobenzene was added dropwise to the ammonium chloride slurry over a period of 3.2 hours. The reaction then proceeds to completion as evidenced by the hydrogen chloride evolution rate. Upon completion of the reaction, the solution was filtered and the filtrate distilled to remove the monochlorobenzene. The phosphonitrilic chloride crudes were washed with low boiling petroleum ether to extract the cyclic phosphonitrilic chloride polymers. The cyclic polymers were then crystallized from the ether.

Based on the amount of phosphorus pentachloride charged, a yield of 98 percent cyclic polymers was obtained, the trimer yield being 63 percent. Approximate time to 90 percent completion of the reaction was 245 minutes.

*Example 2*

Commercial grade ammonium chloride (2.2 moles) 60 microns or larger in size was dispersed in 2 liters of monochlorobenzene at 30° C. The temperature was then increased to the solvent's boiling point under reflux conditions. Phosphorus pentachloride (2.0 moles) dissolved in 1 liter of hot monochlorobenzene was added in 50 cubic centimeter portions over a 3.2 hour period. The reaction then proceeds to completion as evidenced by the hydrogen chloride evolution rate. Terminal processing of the phosphonitrilic chloride polymers was the same as in Example 1.

Based on the amount of phosphorus pentachloride charged a yield of 84 percent cyclic polymers was obtained, the trimer yield being 45 percent. Approximate time to 90 percent completion of the reaction was 950 minutes.

Comparison of results in the above examples indicates that the use of ultrafine ammonium chloride in the reaction $PCl_5 + NH_4Cl \rightarrow PNCl_2 + 4HCl$ increased the cyclic phosphonitrilic chloride content 15 percent and the trimer content 40 percent over conventional yields, while reducing the reaction time 75 percent. The extraordinary increase in the reaction efficiency and the orientation of the reaction towards formation of cyclic polymers, particularly the trimeric polymer, were unexpected.

The use of finely divided ammonium chloride prepared by conventional time consuming methods, with their many transfer problems, is illustrated in the next example.

*Example 3*

Commercial grade ammonium chloride (3.6 moles) was reduced to an average particle size of 5 microns by ball-milling for 19 hours in monochlorobenzene. Two moles of phosphorus pentachloride dissolved in hot monochlorobenzene was added portion wise in 50 c. cm. increments to the refluxing slurry of ammonium chloride and monochlorobenzene over a 3.2 hour period. The reaction then proceeded to completion as evidenced by the HCl evolution rate. Terminal processing of the phosphonitrilic chloride polymers was the same as in Example 1.

Based on the amount of phosphorus pentachloride charged, a yield of 91 percent cyclic polymers was obtained, the trimer yield being 57 percent. Approximate time to 95 percent completion was 295 minutes.

Various changes and modifications may be made in the method and apparatus of this invention, certain preferred forms of which have been herein described without departing from the spirit and scope of this invention. These modifications of this basic invention are to be regarded as within the scope and purview of this invention.

We claim:

1. The method for producing phosphonitrilic chloride polymer which comprises reacting ammonia and hydrogen chloride in an inert solvent sufficiently to form a dispersion of ammonium chloride in said solvent, wherein the ammonium chloride particle size does not exceed 5 microns, introducing phosphorus pentachloride to said dispersion and reacting sufficiently to form a reaction product comprising phosphonitrilic chloride polymer, and recovering the polymer from the reaction product.

2. The method for producing phosphonitrilic chloride polymers by the reaction of phosphorus pentachloride and ammonium chloride, which comprises reacting gaseous hydrogen chloride and ammonia in an inert solvent sufficiently to produce a dispersion of ammonium chloride in solvent, wherein the ammonium chloride particle size does not exceed 5 microns, heating the dispersion at reflux temperature of said solvent, adding a solution of phosphorus pentachloride dissolved in inert solvent to the heated dispersion and reacting to substantial completion sufficiently to form a product comprising a cyclic phosphonitrilic chloride polymer, and thereafter separating the said solvent from the phosphonitrilic chloride polymers.

3. The method according to claim 2 wherein said polymers are dissolved in low boiling petroleum ether sufficiently to further separate soluble phosphonitrilic chloride polymers into a solution phase from insoluble undissolved phosphonitrilic polymers, separating the undissolved phosphonitrilic chlorides from the solution phase consisting of said ether and ether soluble cyclic phosphonitrilic chloride polymers, and thereafter separating from the said solution the cyclic phosphonitrilic chloride polymers.

4. The method for producing phosphonitrilic chloride polymers by the reaction of phosphorus pentachloride and ammonium chloride, which comprises reacting gaseous hydrogen chloride and ammonia in an inert solvent at room temperature sufficiently to produce a dispersion of ammonium chloride in solvent, wherein the ammonium chloride particle size does not exceed 5 microns, heating the dispersion at reflux temperature of said solvent, adding a solution of phosphorus pentachloride dissolved in an inert solvent to the heated dispersion, and reacting to substantial completion sufficiently to form a product comprising cyclic phosphonitrilic chloride polymers, and thereafter separating said solvent from the phosphonitrilic chloride polymers.

5. The method for producing phosphonitrilic chloride cyclic polymers which comprises reacting ammonia and hydrogen chloride in an inert solvent sufficiently to form a dispersion of ammonium chloride in said solvent, wherein the ammonium chloride particle size does not exceed 5 microns, and reacting phosphorus pentachloride with said ammonium chloride particles, said reacting being at a temperature sufficiently high to produce a product comprising phosphonitrilic chloride cyclic polymers.

6. The method for producing cyclic phosphonitrilic chloride polymers by the reaction of phosphorus pentachloride and ammonium chloride wherein the ammonium chloride particle size does not exceed 5 microns which comprises reacting gaseous hydrogen chloride and ammonia in an inert solvent at room temperature sufficiently to produce a dispersion of ammonium chloride in solvent, heating the dispersion at reflux temperature of said solvent, adding a solution of phosphorus pentachloride dissolved in an inert solvent to the heated dispersion and allowing the reaction to proceed to completion sufficiently to form a product comprising phosphonitrilic chloride polymers, separating the said solvent from the phosphonitrilic chloride polymers, dissolving the said polymers into a solution phase consisting of low boiling petroleum ether and ether-soluble cyclic phosphonitrilic chloride polymers sufficiently to leave undissolved insoluble phosphonitrilic chloride polymers, separating the undissolved phosphonitrilic chloride polymers from the solution phase and thereafter separating from said solution the cyclic phosphonitrilic chloride polymers.

7. The method according to claim 6 wherein a catalyst is employed sufficiently to promote the reaction between the phosphorus pentachloride and the ammonium chloride.

8. The method according to claim 6 wherein the inert solvent is a chlorinated hydrocarbon having a boiling point in excess of 100° centigrade.

9. The method according to claim 6 wherein the solvent is a chlorinated hydrocarbon selected from the group consisting of monochlorobenzene, orthodichlorobenzene, sym-tetrachloroethane, trichlorobenzene and tetrachloroethylene.

10. The method according to claim 6 wherein the solvent is monochlorobenzene.

11. The method according to claim 6, wherein said ammonium chloride is characterized by a particle size of from about one to about two microns, wherein the solvent is characterized by a boiling point sufficiently low that the solvent may be removed afterwards from the solution without further substantial polymerization, and wherein the polymer-forming reaction is carried out at a temperature ranging from about 100 degrees centigrade to about 150 degrees centigrade.

References Cited

FOREIGN PATENTS 614,267  2/1961  Canada.
354,078  2/1922  Germany.

OTHER REFERENCES

Paddock et al.: "Advances in Inorganic Chemistry and Radiochemistry," 1959 vol. (I), pp. 348–349.

MILTON WEISSMAN, *Primary Examiner.*